(12) United States Patent
Watanabe et al.

(10) Patent No.: US 11,493,928 B2
(45) Date of Patent: Nov. 8, 2022

(54) TRAJECTORY GENERATION APPARATUS

(71) Applicant: Toyota Jidosha Kabushiki Kaisha, Toyota (JP)

(72) Inventors: Yuta Watanabe, Toyota (JP); Kazuto Murase, Miyoshi (JP); Koji Terada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

(21) Appl. No.: 16/682,428

(22) Filed: Nov. 13, 2019

(65) Prior Publication Data

US 2020/0159235 A1 May 21, 2020

(30) Foreign Application Priority Data

Nov. 16, 2018 (JP) .............................. JP2018-215376

(51) Int. Cl.
*G05D 1/02* (2020.01)
*B25J 9/16* (2006.01)

(52) U.S. Cl.
CPC ........... *G05D 1/0223* (2013.01); *B25J 9/1664* (2013.01); *G05D 2201/0213* (2013.01)

(58) Field of Classification Search
CPC .................. G05D 1/0223; G05D 2201/0213
See application file for complete search history.

(56) References Cited

U.S. PATENT DOCUMENTS

| 5,694,265 A * | 12/1997 | Kosugi .................. G11B 5/596 |
| 2019/0047153 A1* | 2/2019 | Mönnich ................ B25J 9/1664 |
| 2019/0243360 A1* | 8/2019 | Uetani .................... G01C 21/26 |

FOREIGN PATENT DOCUMENTS

| CN | 108227719 A | 6/2018 |
| JP | S63144975 A | 6/1988 |
| JP | H08-249073 A | 9/1996 |
| JP | 2006-15431 A | 1/2006 |
| JP | 2009-211571 A | 9/2009 |

\* cited by examiner

*Primary Examiner* — Jason Holloway
*Assistant Examiner* — Dylan M Katz
(74) *Attorney, Agent, or Firm* — Dinsmore & Shohl LLP

(57) ABSTRACT

A trajectory generation apparatus according to an embodiment includes an arithmetic unit capable of generating a positional trajectory of a movable part of a robot, in which: the arithmetic unit is further capable of generating a velocity trajectory of the movable part; and a predetermined time before switching a trajectory along which the movable part is moved from the velocity trajectory to the positional trajectory, the arithmetic unit predicts a position of the movable part at the time of the switching and generates the positional trajectory that starts from the predicted position.

3 Claims, 2 Drawing Sheets

TRAJECTORY GENERATION APPARATUS

CROSS REFERENCE TO RELATED APPLICATIONS

This application is based upon and claims the benefit of priority from Japanese patent application No. 2018-215376, filed on Nov. 16, 2018, the disclosure of which is incorporated herein in its entirety by reference.

BACKGROUND

The present disclosure relates to a trajectory generation apparatus, for example, a trajectory generation apparatus that generates a trajectory along which a hand of a robot moves.

Japanese Unexamined Patent Application Publication No. 2009-211571 discloses a trajectory generation apparatus that generates a trajectory of positions (hereinafter also referred to as a positional trajectory) of a robot so that the robot can avoid an obstacle by using a simulation according to dynamics of a multi-particle system.

SUMMARY

The present inventors have found the following problem. When a trajectory of a robot is switched from a trajectory of velocities (hereinafter also referred to as a velocity trajectory) to a positional trajectory, the robot needs to be temporarily stopped so that its current position, which is used as the initial value of the positional trajectory, is recognized. Therefore, the robot cannot be smoothly moved. Further, even if the positional trajectory is predicted and calculated before the switching, there is a possibility that a deviation may occur in the position of the robot at the time of the switching, thus making it impossible to accurately calculate the positional trajectory. It is desired to provide a trajectory generation apparatus capable of preventing such problems.

The present disclosure has been made to solve the above-described problem and provides a trajectory generation apparatus capable of smoothly moving a movable part of a robot.

A first exemplary aspect is a trajectory generation apparatus including an arithmetic unit capable of generating a positional trajectory of a movable part of a robot, in which: the arithmetic unit is further capable of generating a velocity trajectory of the movable part, and a predetermined time before switching a trajectory along which the movable part is moved from the velocity trajectory to the positional trajectory, the arithmetic unit predicts a position of the movable part at the time of the switching and generates the positional trajectory that starts from the predicted position. By the above-described configuration, there is no need to stop the robot when the trajectory of its movable part is switched from the velocity trajectory to the positional trajectory, thus making is possible to smoothly move the movable part.

Further, when there is a deviation between the predicted position and an arrival position at which the movable part has arrived at the time of the switching, the arithmetic unit interpolates a trajectory between the arrival position and a connection point, the connection point being a point that is located on the generated positional trajectory and is a predetermined distance apart from the predicted position. By the above-described configuration, there is no need to stop the robot even when there is a deviation between the predicted position and the arrival position, thus making is possible to smoothly move the movable part.

Further, the predetermined time is changed according to a velocity of the movable part on the velocity trajectory. By the above-described configuration, the positional trajectory can be accurately generated.

According to the present disclosure, it is possible to provide a trajectory generation apparatus capable of smoothly moving a movable part of a robot.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments for implementing the present disclosure will be described hereinafter with reference to the drawings. However, the present disclosure is not limited to the below-shown embodiments. Further, the following descriptions and drawings are simplified as appropriate for clarifying the explanation.

First Embodiment

A trajectory generation apparatus according to a first embodiment is explained. The trajectory generation apparatus according to this embodiment generates, for example, a trajectory along which a movable part such as a hand of a mobile object such as a robot is moved. Firstly, a configuration of a robot is described as a mobile object including the trajectory generation apparatus. After that, a method for generating a trajectory of a movable part of a robot by a trajectory generation apparatus will be described.

(Configuration of Robot)

Figure 1:
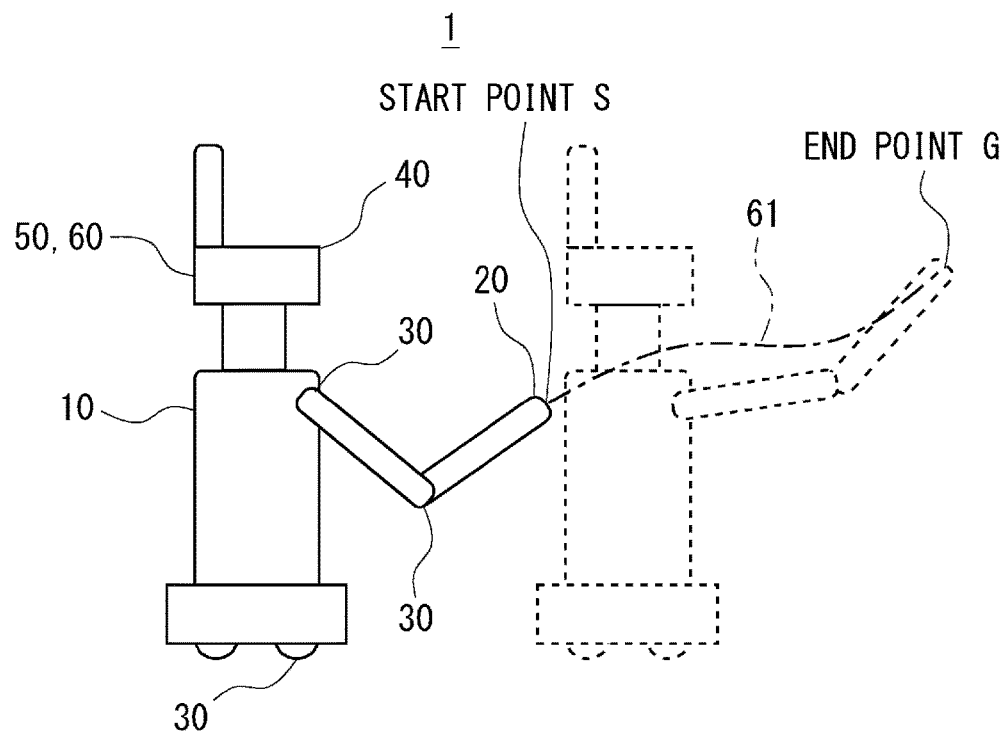
FIG. 1 shows an example of a configuration of a robot according to a first embodiment.
Figure 2:
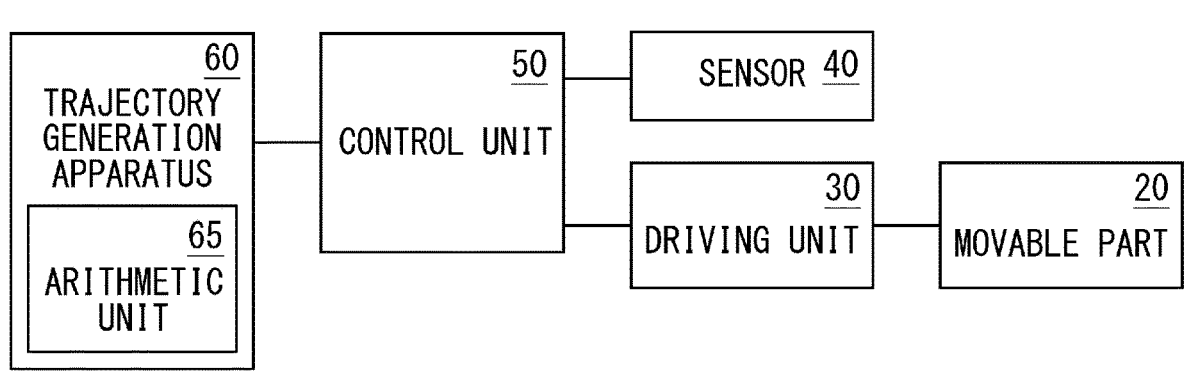
FIG. 2 is a block diagram showing an example of the configuration of the robot according to the first embodiment.

FIG. 1 shows an example of a configuration of a robot 1 according to the first embodiment. FIG. 2 is a block diagram showing an example of the configuration of the robot 1 according to the first embodiment. As shown in FIGS. 1 and 2, the robot 1 includes a main body 10, a movable part 20, a driving unit 30, a sensor 40, a control unit 50, and a trajectory generation apparatus 60.

The main body 10 constitutes a body of the robot 1. The movable part 20 of the robot 1 is attached to the main body 10. Further, as the driving unit 30 that moves the main body 10, for example, wheels and a motor(s) that rotates the wheel(s) are attached to a lower part of the main body 10. For example, the main body 10 moves as the wheels rotate. Note that the driving unit 30, which moves the main body 10, is not limited to the wheels and the motor that rotates the wheels. That is, the driving unit may be, for example, two legs by which the robot walks.

The movable part 20 is, for example, a hand of the robot 1. The movable part 20 is attached to the main body 10 with the driving unit 30 interposed therebetween. The driving unit 30 of the movable part 20 is, for example, a joint and an actuator. The movable part 20 moves as the joint rotates.

The driving unit 30 includes the wheels and the motor, which rotates the wheels, attached to the lower part of the main body 10. Further, the driving unit includes the joint and the actuator, which rotates the joint. The joint and the actuator are configured to move the movable part 20. As the main body 10 moves, the movable part 20 also moves.

The sensor 40 detects a position of the robot 1, in particular, positions of the main body 10 and the movable part 20. For example, the sensor 40 is a camera that takes images of the main body 10 and the movable part 20. The sensor 40 detects the positions of the main body 10 and the movable part 20 based on the taken images. The sensor 40 may be an encoder disposed in the motor and the actuator of the driving unit 30. The sensor 40 may detect the positions of the main body 10 and the movable part 20 based on a measured rotation signal. The sensor 40 outputs information about detected positions to the control unit 50.

The sensor 40 detects a velocity (a speed and its direction) of the robot 1, and an angular velocity (an angular speed and its direction) thereof. Specifically, the sensor 40 detects the velocities and the angular velocities of the main body 10 and the movable part 20. The sensor 40 may detect the velocities and the like of the main body 10 and the movable part 20 from a plurality of images taken at predetermined time intervals by a camera, or may detect the velocities and the like of the main body 10 and the movable part 20 by encoders disposed in the motor and the actuator. The sensor 40 outputs information about the detected velocities and the like to the control unit 50.

The control unit 50 controls the movement of the robot 1. The control unit 50 controls the movements of the main body 10 and the movable part 20 based on information about the positions and the velocities (the speeds and their directions) of the main body 10 and the movable part 20 detected by the sensor 40. Specifically, for example, the control unit 50 controls the movements of the main body 10 and the movable part 20 by controlling the angular velocities of the rotations of the motor and the joint. The control unit 50 is, for example, a general-purpose computer.

The trajectory generation apparatus 60 includes an arithmetic unit 65. The arithmetic unit 65 generates a trajectory 61 along which the movable part 20 of the robot 1 is moved. The arithmetic unit 65 generates a trajectory 61 for moving the movable part 20 from a starting point S to an end point G. The arithmetic unit 65 generates a positional trajectory and a velocity trajectory as the trajectory 61. The positional trajectory means a trajectory that is controlled based on the position of the movable part 20. The velocity trajectory means a trajectory that is controlled based on the velocity of the movable part 20. As described above, the trajectory generation apparatus 60 includes the arithmetic unit 65 capable of generating a positional trajectory and a velocity trajectory of the movable part 20 of the robot 1.

When the arithmetic unit 65 generates a velocity trajectory, it generates, for example, a velocity trajectory that is obtained by connecting velocities with one another from the starting point S to the end point G based on conditions acquired from the sensor 40, such as the position of the starting point S, the velocity and the angular velocity of the movable part 20 at the starting point S, the position of the end point G, and the velocity and the angular velocity of the movable part 20 at the end point G. Note that the arithmetic unit 65 may generate the velocity trajectory without using some of these conditions, or may generate the velocity trajectory by using conditions other than these conditions.

When the arithmetic unit 65 generates a positional trajectory, it generates, for example, a positional trajectory that is obtained by connecting positions P with one another from the starting point S to the end point G based on conditions acquired from the sensor 40, such as the position of the starting point S, the velocity and the angular velocity of the movable part 20 at the starting point S, the position of the end point G, and the velocity and the angular velocity of the movable part 20 at the end point G. Note that the arithmetic unit 65 may generate the positional trajectory without using some of these conditions, or may generate the positional trajectory by using conditions other than these conditions.

The control unit 50 controls the movements of the main body 10 and the movable part 20 so that the movable part 20 of the robot 1 moves along the trajectory 61 generated by the arithmetic unit 65. For example, in order to move the movable part 20 along the velocity trajectory, the control unit 50 controls the driving unit 30 so that the actual velocity of the movable part 20 acquired from the sensor 40 conforms to the velocity of the movable part 20 on the velocity trajectory generated by the arithmetic unit 65.

Further, for example, in order to move the movable part 20 along the positional trajectory, the control unit 50 controls the driving unit 30 so that the actual position of the movable part 20 acquired from the sensor 40 conforms to the position of the movable part 20 on the velocity trajectory generated by the arithmetic unit 65.

The velocity trajectory is used when the movable part 20 is moved at a predetermined velocity. For example, the velocity trajectory is used when the movable part 20 is swiftly moved to the vicinity of the end point G. In contrast, the positional trajectory is used when the position to which the movable part 20 is moved is accurately controlled. For example, the positional trajectory is used when the movable part 20 is accurately moved along a predetermined route.

For example, when the robot 1 grasps an object placed on a stand located at a distance from the robot 1 by the movable part 20, the trajectory of the movable part 20 is controlled based on the velocity trajectory until when the movable part 20 reaches the vicinity of the stand. When the movable part 20 reaches the vicinity of the stand and grasps the object placed on the stand, the trajectory of the movable part 20 is controlled based on the positional trajectory. In this way, it is possible to give a priority to the arrival time over the accuracy of the position of the movable part 20 on the trajectory until when the movable part 20 reaches the vicinity of the stand. Therefore, it is possible to reduce the time taken for the movable part 20 to reach the vicinity of the stand.

On the other hand, when the robot 1 grasps the object on the stand, it is possible to give a priority to the accuracy of the position of the movable part 20 on the trajectory over the time taken for the movement of the movable part 20 in order to prevent the robot 1 from failing to grasp the object. Therefore, it is possible to accurately grasp the object on the stand.

As described above, it is possible to swiftly and accurately move the movable part 20 to the target point by switching the trajectory along which the movable part of the robot 1 is moved from the velocity trajectory to the positional trajectory.

Note that the movable part 20 of the robot 1 is also controlled based on the positional trajectory when the movable part 20 is moved in the vicinity of an object that could interfere with (e.g., collide with) the movable part 20. In this way, it is possible to prevent the movable part 20 from coming into contact with (e.g., colliding with) such objects.

(Method for Generating Trajectory)

Next, a method for generating a trajectory is described. In this embodiment, when the arithmetic unit 65 of the trajectory generation apparatus 60 switches the trajectory, along which the movable part 20 is moved, from the velocity trajectory to the positional trajectory, the arithmetic unit 65 predicts, a predetermined time before the time of the switching (i.e., at a timing that is the predetermined time earlier than the timing of the actual switching), the position of the movable part 20 at the time of the switching. Then, the arithmetic unit 65 generates a positional trajectory that starts from the predicted position.

Figure 3:
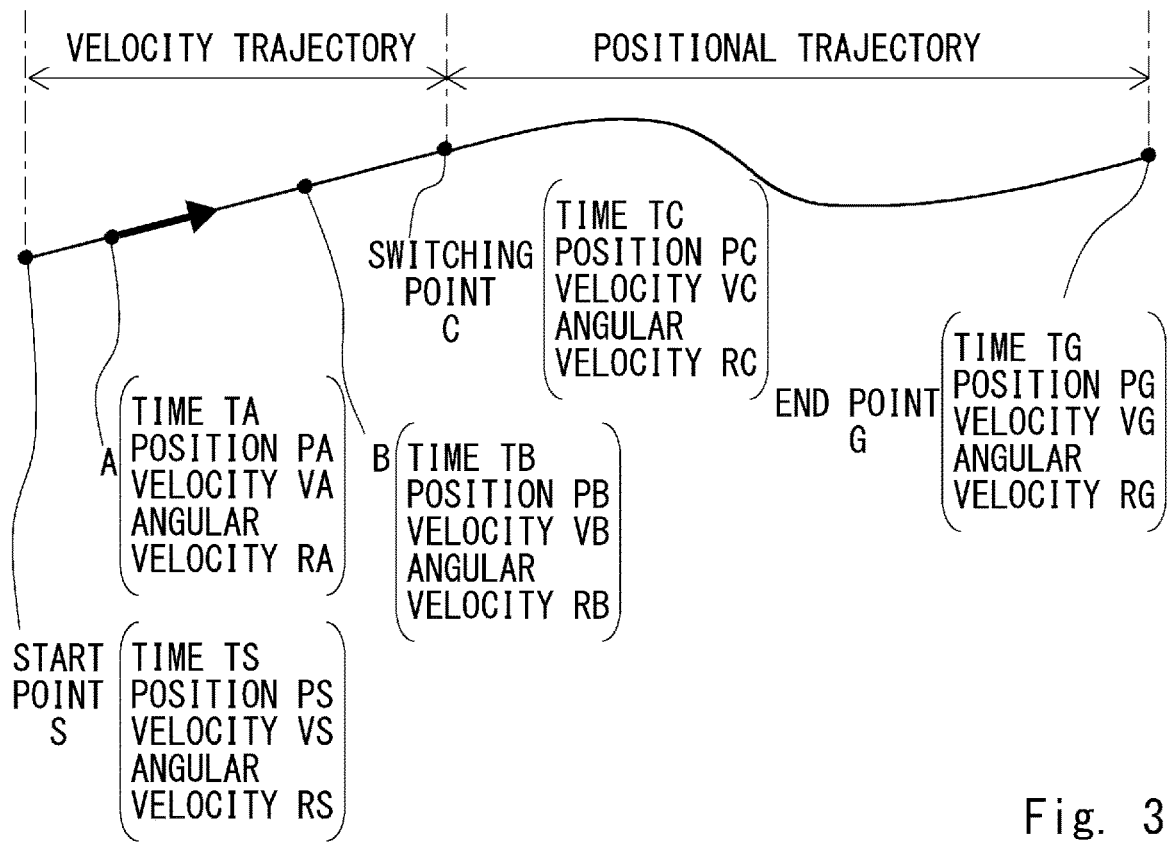
FIG. 3 shows an example of an arithmetic unit of a trajectory generation apparatus according to the first embodiment.

FIG. 3 shows an example of a trajectory 61 generated by the arithmetic unit 65 of the trajectory generation apparatus 60 according to the first embodiment. The arithmetic unit 65 generates a trajectory from a starting point S of the movable part 20 of the robot 1 to an end point G thereof. For example, the arithmetic unit 65 generates a trajectory of the movable part 20 as a velocity trajectory until a time TC at which the trajectory is switched.

When the arithmetic unit 65 generates the velocity trajectory, it is assumed that at a time TS, the movable part 20, which is located at a position PS, i.e., at the starting point S, has a velocity VS and an angular velocity RS. Then, the arithmetic unit 65 generates the velocity trajectory along which the movable part 20 moves at least at either a speed VA or an angular velocity RA. The control unit 50 controls the movable part 20 based on at least either its velocity VA or angular velocity RA until the time TC, i.e., until the timing of the switching.

At a time TB, which is a predetermined time earlier than the time TC, i.e., earlier the timing of the actual switching, the control unit 50 makes the trajectory generation apparatus 60 predict a position PC of the movable part 20 at the time TC, i.e., at the time of the switching. As the predetermined time, the control unit 50 sets a time that the arithmetic unit 65 of the trajectory generation apparatus 60 requires to generate a positional trajectory. For example, 200 [msec] is set as the predetermined time. The arithmetic unit 65 predicts the position PC of the movable part 20 at the time TC, i.e., at the time of the switching under the control of the control unit 50. The predicted position is also referred to as a predicted position PC. The arithmetic unit 65 acquires a current position PB, a current velocity VB, and a current angular velocity RB detected by the sensor 40 through the control unit 50 in order to predict the predicted position PC. Then, the arithmetic unit 65 calculates the predicted position PC by adding a value obtained by integrating the current velocity VB or the current angular velocity RB to the acquired current position PB.

Then, the arithmetic unit 65 generates a positional trajectory from the predicted position PC. The control unit 50 controls the movement of the movable part 20 based on the velocity of the movable part 20 until the time TC, i.e., until the timing of the switching. Further, the control unit 50 controls the movement of the movable part 20 based on the position of the movable part 20 from the time TC, i.e., from the timing of the switching.

In the trajectory generation apparatus 60 according to this embodiment, the arithmetic unit 65 generates a positional trajectory, which is a trajectory that starts at the timing of the switching, at a timing that is a predetermined time earlier than the timing of the switching. Therefore, when the velocity trajectory of the robot 1 is switched from the velocity trajectory to the positional trajectory, there is no need to temporarily stop the robot 1 in order to recognize the current position of the robot 1, which is used as the initial value of the positional trajectory. Therefore, it is possible to smoothly move the movable part 20 of the robot 1.

The time TB, at which the prediction of the position PC of the movable part at the time of the switching is started, is the predetermined time earlier than the timing of the switching. In some embodiments, the predetermined time is longer than the time that the arithmetic unit 65 requires to generate the positional trajectory. For example, the time required to generate the trajectory is set in the control unit 50 in advance. For example, the time that the arithmetic unit 65 takes to generate the positional trajectory is 200 [msec]. Further, it is desirable that the predetermined time be changed according to the velocity of the movable part 20 on the velocity trajectory. For example, when the velocity of the movable part 20 on the velocity trajectory is large, the control unit 50 takes a long time to control the velocity of the movable part 20. Therefore, the predetermined time is increased. Conversely, when the velocity of the movable part 20 on the velocity trajectory is small, the predetermined time is decreased. In this way, it is possible to improve the accuracy of the predicted position PC.

Second Embodiment

Figure 4:
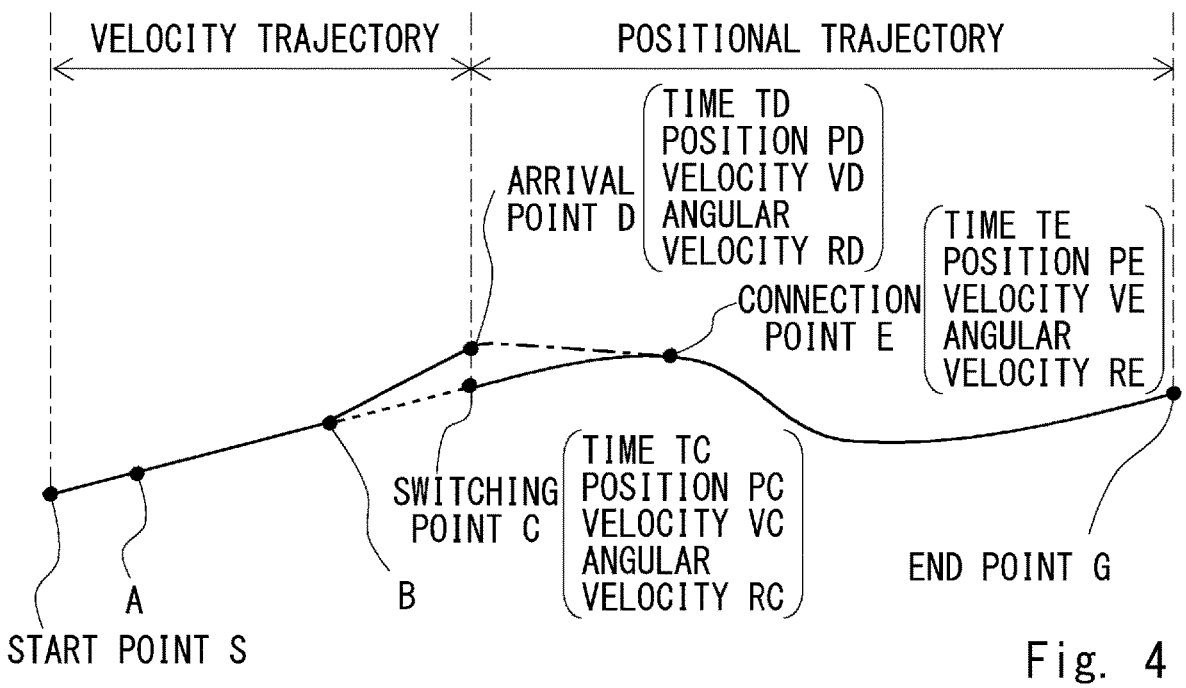
FIG. 4 shows an example of an arithmetic unit of a trajectory generation apparatus according to a second embodiment.

Next, a trajectory generation apparatus 60 according to a second embodiment is described. FIG. 4 shows an example of a trajectory 62 generated by the trajectory generation apparatus 60 according to the second embodiment. As shown in FIG. 4, in this embodiment, there is a deviation between a predicted position PC predicted by the arithmetic unit 65 of the trajectory generation apparatus 60 and an arrival position PD at which the movable part 20 has actually arrived at a time TC (=a time TD) at which the trajectory is switched. In such a case, the arithmetic unit 65 interpolates a trajectory between the arrival position PD and a position PE, i.e., a connection point E that is located on the generated positional trajectory and is a predetermined distance apart from the predicted position PC.

Specifically, the control unit 50 recognizes that there is a deviation between the arrival position PD, at which the movable part 20 has actually arrived, and the predicted position PC at the time TC, i.e., at the timing of the switching based on positional information acquired from the sensor 40. In such a case, the control unit 50 makes the trajectory generation apparatus 60 interpolate a trajectory between the arrival position PD and the position PE, i.e., the connection point E that is located on the generated positional trajectory and is a predetermined distance apart from the predicted position PC. The position PE, i.e., the connection point E is a position on the positional trajectory the predetermined distance apart from the predicted position PC.

The predetermined distance is determined based on, for example, the velocity VC of the movable part 20 at the time TC, i.e., at the timing of the switching. That is, it is desirable that the predetermined distance be changed according to the velocity of the movable part 20 on the velocity trajectory. For example, when the velocity of the movable part 20 on the velocity trajectory is large, the control unit 50 takes a long time to control the velocity of the movable part 20. Therefore, the predetermined distance is increased. Conversely, when the velocity of the movable part 20 on the velocity trajectory is small, the predetermined distance is decreased. In this way, it is possible to smoothly connect the interpolated trajectory with the generated positional trajectory.

The arithmetic unit 65 may, for example, connect the arrival position PD with the position PE, i.e., the connection point E with a straight line. Other interpolation methods may also be used. As described above, the arithmetic unit 65 interpolates a trajectory between the arrival position PD and the position PE, i.e., the connection point E.

In the trajectory generation apparatus 60 according to this embodiment, even when there is a deviation in the predicted position PC at the time of the switching, it is possible to smoothly move the robot by interpolating a trajectory between the deviated position and the positional trajectory.

Embodiments of the present disclosure have been explained above. However, the present disclosure is not limited to the above-described configurations, and they can be modified without departing from the technical idea of the present disclosure. For example, a movable body such as a robot that includes a trajectory generation apparatus according to the first and the second embodiments is also included in the technical concept of the present disclosure. Further, a trajectory generation apparatus and a movable object obtained by combining the first and the second embodiments are also included in the technical concept of the present disclosure.

From the disclosure thus described, it will be obvious that the embodiments of the disclosure may be changed in many ways. Such variations are not to be regarded as a departure from the spirit and scope of the disclosure, and all such modifications as would be obvious to one skilled in the art are intended for inclusion within the scope of the following claims.

What is claimed is:

1. A robot configured to:
   generate a positional trajectory of a movable part of the robot,
   generate a velocity trajectory of the movable part,
   switch a trajectory along which the movable part is moved from the velocity trajectory to the positional trajectory, and
   a predetermined time before switching the trajectory along which the movable part is moved from the velocity trajectory to the positional trajectory, predict a position of the movable part at the time of the switching and generate the positional trajectory that starts from the predicted position.

2. The robot according to claim 1, wherein when there is a deviation between the predicted position and an arrival position at which the movable part has arrived at the time of the switching, the robot interpolates a trajectory between the arrival position and a connection point, the connection point being a point that is located on the generated positional trajectory and is a predetermined distance apart from the predicted position.

3. The robot according to claim 1, wherein the predetermined time is changed according to a velocity of the movable part on the velocity trajectory.

\* \* \* \* \*